United States Patent
Darnell

(10) Patent No.: US 9,874,159 B2
(45) Date of Patent: Jan. 23, 2018

(54) ALTITUDE COMPENSATION FOR INTERNAL COMBUSTION ENGINE

(71) Applicant: Jaguar Land Rover Limited, Coventry (GB)

(72) Inventor: Paul Darnell, Coventry (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 298 days.

(21) Appl. No.: 14/384,246

(22) PCT Filed: Mar. 12, 2013

(86) PCT No.: PCT/EP2013/055021
§ 371 (c)(1),
(2) Date: Sep. 10, 2014

(87) PCT Pub. No.: WO2013/135714
PCT Pub. Date: Sep. 19, 2013

(65) Prior Publication Data
US 2015/0027407 A1      Jan. 29, 2015

(30) Foreign Application Priority Data
Mar. 12, 2012  (GB) .................................. 1204327.9

(51) Int. Cl.
*F02D 25/02*   (2006.01)
*B60W 10/06*   (2006.01)
(Continued)

(52) U.S. Cl.
CPC ............. *F02D 25/02* (2013.01); *B60W 10/06* (2013.01); *B60W 10/08* (2013.01); *B60W 10/26* (2013.01);
(Continued)

(58) Field of Classification Search
CPC ...... B60W 10/06; B60W 10/08; B60W 10/26; B60W 20/19; B60W 2510/0633;
(Continued)

(56) References Cited

U.S. PATENT DOCUMENTS 6,230,496 B1 * 5/2001 Hofmann ............... B60K 6/105
                                                                180/65.27
6,507,127 B1 * 1/2003 Amano ................. B60L 11/123
                                                                290/40 A
(Continued)

FOREIGN PATENT DOCUMENTS

DE           10005581 A1   10/2000
DE    10 2006 059 664 A1    7/2007
(Continued)

OTHER PUBLICATIONS 161207 machine translation JP 2005-180255 w drawings.*
(Continued)

*Primary Examiner* — Carlos A Rivera
*Assistant Examiner* — Carl Staubach
(74) *Attorney, Agent, or Firm* — Myers Bigel, P.A.

(57) ABSTRACT

In order to address turbo lag at altitude, a vehicle boosts output torque of an internal combustion engine with electric motor torque generated from a battery. The residual charge of the battery is increased at altitude to provide a sufficient reserve for the corresponding increase in turbo lag. The invention is typically applied to a parallel hybrid vehicle.

13 Claims, 2 Drawing Sheets

(51) Int. Cl.
*B60W 10/26* (2006.01)
*B60W 10/08* (2006.01)
*F02B 37/00* (2006.01)
*H01M 10/42* (2006.01)
*H01M 10/48* (2006.01)
*B60W 20/19* (2016.01)

(52) U.S. Cl.
CPC ............. *B60W 20/19* (2016.01); *F02B 37/00* (2013.01); *H01M 10/425* (2013.01); *H01M 10/48* (2013.01); *B60W 2510/0633* (2013.01); *B60W 2510/244* (2013.01); *B60W 2550/13* (2013.01); *B60W 2710/083* (2013.01); *B60Y 2400/435* (2013.01); *H01M 2220/20* (2013.01); *Y02T 10/6286* (2013.01)

(58) Field of Classification Search
CPC ....... B60W 2510/244; B60W 2550/13; B60W 2710/083; B60Y 2400/435; F02B 37/00; F02D 25/02; H01M 10/425; H01M 10/48; H01M 2220/20
USPC ................ 701/22, 101, 110, 115; 180/65.21, 180/65.25–65.29; 123/179.28, 383, 528, 123/559.1–559.3, 677; 60/706, 698, 607, 60/608; 320/149; 903/903; 290/16, 17, 290/38 R, 40 R
See application file for complete search history.

(56) References Cited

U.S. PATENT DOCUMENTS

| | | | | |
|---|---|---|---|---|
| 8,562,484 B1* | 10/2013 | Nedorezov | ........... | B60W 10/02 477/32 |
| 2004/0030469 A1* | 2/2004 | MacBain | ................. | B60K 6/48 701/22 |
| 2004/0030471 A1* | 2/2004 | Faye | ........................ | B60K 6/48 701/22 |
| 2007/0125083 A1* | 6/2007 | Rollinger | ................. | B60K 6/48 60/605.1 |
| 2007/0204830 A1* | 9/2007 | Andri | ..................... | B60K 6/445 123/198 F |
| 2007/0278021 A1 | 12/2007 | Pott et al. | | |
| 2008/0147259 A1* | 6/2008 | Choi | ........................ | B60L 11/12 701/22 |
| 2011/0005850 A1 | 1/2011 | Colvin et al. | | |
| 2011/0024211 A1* | 2/2011 | Kikuchi | .................. | B60K 6/445 180/65.25 |
| 2013/0042617 A1* | 2/2013 | Atkins | ................... | B60K 6/105 60/698 |
| 2014/0002027 A1* | 1/2014 | Guan | .................... | H02J 7/0014 320/128 |

FOREIGN PATENT DOCUMENTS

| | | | |
|---|---|---|---|
| DE | 10 2006 019 031 A1 | 10/2007 | |
| EP | 0 829 389 A2 | 3/1998 | |
| JP | 2005-180255 * | 7/2005 | ............. F02D 29/02 |
| JP | 2005180255 A | 7/2005 | |
| WO | WO 2009/115875 A1 | 9/2009 | |

OTHER PUBLICATIONS

International Search Report, PCT/EP2013/055021, dated Nov. 13, 2013, 4 pages.
Combined Search and Examination Report, Application No. GB1204327.9, dated Jun. 29, 2012, 5 pages.
Notification of the First Office Action, Chinese Application No. 201380013956.9, dated Dec. 28, 2015, 19 pages.
The Second Office Action, Chinese Application No. 201380013956.9, dated Sep. 14, 2016, 20 pages.
The Third Office Action, Chinese Application No. 201380013956.9, dated Mar. 20, 2017.

* cited by examiner

ALTITUDE COMPENSATION FOR INTERNAL COMBUSTION ENGINE

RELATED APPLICATIONS

This application is a 35 U.S.C. §371 national stage application of PCT Application No. PCT/EP2013/055021, filed on Mar. 12, 2013, which claims priority from Great Britain Patent Application No. 1204327.9, filed Mar. 12, 2012, the contents of which are incorporated herein by reference in their entireties. The above-referenced PCT International Application was published in the English language as International Publication No. WO 2013/135714 A2 on Sep. 19, 2013.

FIELD

This invention relates to altitude compensation for an internal combustion engine of a motor vehicle, and particularly addresses a reduction in performance at altitude. Aspects of the invention relate to a method and to a vehicle.

BACKGROUND

It is well understood that air pressure progressively reduces as altitude increases. The consequence for internal combustion engines is that power and torque output also reduces so that a vehicle driver may notice a loss of performance in mountain terrain. Means of providing for loss of performance, for example supercharging, are well understood, but generally impose a significant cost penalty.

Development of vehicles is tending towards engines of smaller swept volume, but relatively higher maximum power and torque. This can be achieved to some extent by turbocharging. A well known phenomenon of an exhaust turbocharger is turbo 'lag', whereby a delay may be experienced by the vehicle driver between demanding an acceleration, and sensing a corresponding increase in engine output torque.

The turbo lag effect is more acute at altitude because the mass flow of gas through the engine is reduced (absent some special corrective measures), with the consequence that the turbocharger turbine takes longer to spool up to a speed at which the turbocharger compressor becomes effective. The turbo lag effect may also be exacerbated by the use of smaller engines.

Hybrid vehicles typically comprise an internal combustion engine, an electric motor and a battery. A so-called plug in hybrid includes a traction battery which may be charged overnight from a relatively low cost domestic electric supply. Electric traction is not sensitive to altitude.

One kind of hybrid vehicle is a sequential parallel hybrid whereby electric traction is used in preference to the internal combustion engine until the remaining charge stored in the battery falls to a pre-determined minimum value.

A parallel hybrid vehicle may also use the internal combustion engine and electric motor together to boost acceleration, and this technique may be used to compensate for turbo lag.

However in normal use as a sequential parallel hybrid, i.e. electric traction is used preferentially, there may be insufficient reserve of electrical power in the vehicle to boost an internal combustion engine at the minimum state of charge of the battery. On the other hand, the benefits of a parallel hybrid vehicle cannot be fully realised if a greater reserve of electrical power is retained in case of changing conditions of vehicle use, in particular to deal with all circumstances in which an electric and engine mode of operation may be required.

It is against this background that the present invention has been conceived. Embodiments of the invention may provide an improved method or apparatus which addresses one or more of the above issues. Other aims and advantages of the invention will become apparent from the following description, claims and drawings.

SUMMARY OF THE INVENTION

According to one aspect of the present invention there is provided a method of determining the residual capacity of a battery of a vehicle having an internal combustion engine and a forced induction device, said battery being adapted to supplement output torque of said engine via a rotary electrical machine during a lag period of the forced induction device, said method comprising the steps of: determining a minimum capacity of said battery and calculating a residual capacity above said minimum for providing supplemental torque to said engine via said electrical machine during the lag period, said residual capacity increasing with vehicle altitude.

The method is used to maintain the battery at a residual capacity which thus varies according to altitude.

The method of the invention provides a greater reserve of electrical power at altitude, so as to be able to compensate for the relatively greater contribution which is required to compensate for the turbo lag effect.

It will be appreciated that the relative increase in residual capacity above minimum capacity is a matter of judgement for the skilled man, having regard to the type of vehicle and to the expected conditions of use. However for a defined vehicle, a compromise may be reached which allows for an effective contribution of torque from the rotary electrical machine to the intent that the turbo lag effect is substantially eliminated at all altitudes.

It will be understood that torque contribution from the rotary electrical machine may also occur at sea level, but to a lesser extent than at altitude. At sea level the residual capacity is however reduced as compared with altitude, in accordance with the invention.

The rotary electrical machine is typically a conventional electric motor, but may be a combined motor/generator or other electrical device integrated with a rotatable component of the internal combustion engine or a transmission element. The rotary electrical machine may be connected via a drive belt or chain, and may be a belt integrated starter generator (BISG).

The method of the invention may provide for the residual capacity (the excess over minimum capacity) to be zero at sea level. The residual capacity may increase in proportion, or in direct proportion to the increase in vehicle altitude.

The method of the invention may include charging the battery from the vehicle in use, either to maintain the desired residual charge, or to increase the residual charge to compensate for an increase in vehicle altitude. In the event of a decrease in vehicle altitude, the residual charge may be allowed to fall toward the minimum charge, so as to maximize parallel hybrid operation. Charging may be via the electrical generator of the vehicle engine and/or via regenerative braking.

The battery may be a traction battery of a parallel hybrid vehicle, but the invention is also applicable to other battery types, such as used in BISG systems.

The forced induction device is preferably a turbo or a supercharger.

In a second aspect the invention provides a method of supplementing output torque of an internal combustion engine of a vehicle having a forced induction device and a battery powered rotary electrical machine, the method comprising the steps of: sensing that engine output torque is lower than the torque demanded by the driver of the vehicle during a lag period of the forced induction device; and supplementing engine torque with torque from the electric machine to provide a combined torque substantially equal to the torque demanded by the driver during the lag period, whereby said battery has a minimum capacity, and a residual capacity above said minimum, the residual capacity being increased at altitude. Preferably the forced induction device is a turbo or a supercharger.

In a third aspect the invention provides a hybrid vehicle having an internal combustion engine, a battery, a rotary electric machine powered by the battery, a forced induction device and a control system adapted to limit the rotary output of the electric machine when the battery reaches a residual charge, the residual charge being above a minimum charge of the battery, wherein the control system is further adapted to increase the residual charge of said battery above said minimum charge at altitude so as to provide an increased reserve of electrical energy for powering the electric machine during a lag periods of the forced induction device. The output of the electric machine is a rotational torque output when the machine is configured to act as a motor. In the condition where the electric machine is configured as a generator, the output of the electric machine is an electric output that is preferably used to charge the battery.

In this specification, the term 'residual charge' indicates a reserve of electrical power over a 'minimum charge'. The minimum charge is defined as that level of charge which it is inadvisable to fall below, for reasons of battery life, or that level of charge which must be maintained at sea level for reasons of safety or to provide an emergency power reserve. Available electrical power is not affected by altitude, and according the invention assumes that the same minimum charge is provided to address these factors at all altitudes.

It will be understood that recalculation of residual torque need not be made too frequently as a significant change in vehicle altitude will occur quite slowly. Nevertheless, for compatibility with other vehicle systems, the refresh rate in one embodiment is 10 Hz.

Within the scope of this application it is expressly intended that the various aspects, embodiments, examples and alternatives, and in particular the individual features thereof, set out in the preceding paragraphs, in the claims and/or in the following description and drawings, may be taken independently or in any combination. For example features described in connection with one embodiment are applicable to all embodiments, unless such features are incompatible.

BRIEF DESCRIPTION OF DRAWINGS

Embodiments of the invention will now be described, by way of example only, with reference to the accompanying drawings, in which.

DETAILED DESCRIPTION

Figure 1:
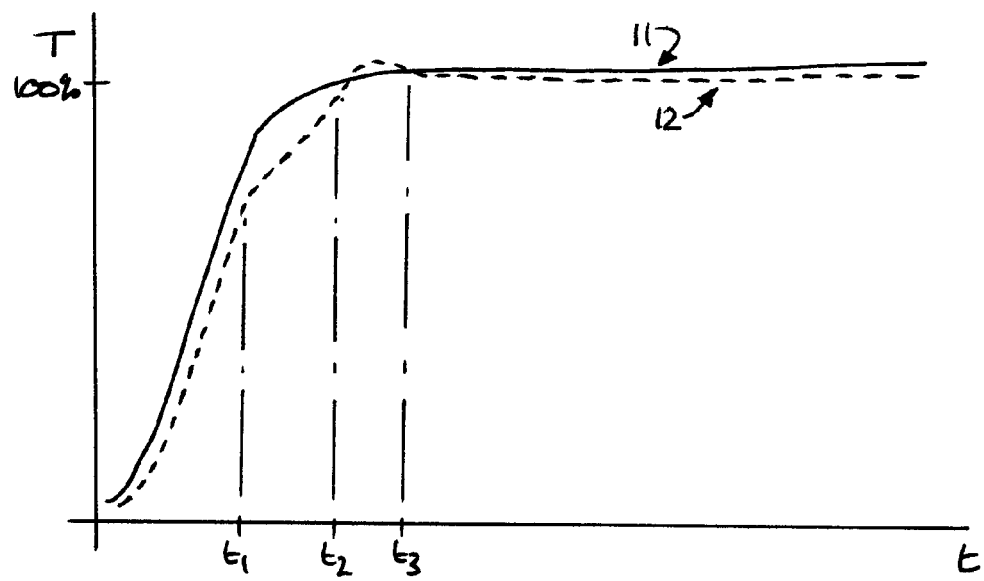
FIG. 1 is a graphical representation of demanded and actual vehicle torque of an internal combustion engine at sea level.

With reference to FIG. 1, torque demand of a vehicle driver is represented by the solid line 11, and corresponds to depression of an accelerator pedal from minimum to maximum at sea level.

Torque response of a turbocharged engine is represented by the dotted line 12, and it can be seen that the rise in engine torque is more or less immediate until $t_1$. This rise represents natural aspiration of the engine.

From $t_1$ to $t_2$, the torque response of the engine is delayed due to the turbo lag effect, and from $t_2$ to $t_3$ the torque response overshoots marginally until settling at a level corresponding to steady driver demand.

The effect of turbo lag is somewhat exaggerated in FIG. 1 for the purposes of illustration, and in practice the turbocharger may be designed to minimize the turbo lag effect at sea level such that it is not noticed by the vehicle driver.

Figure 2:
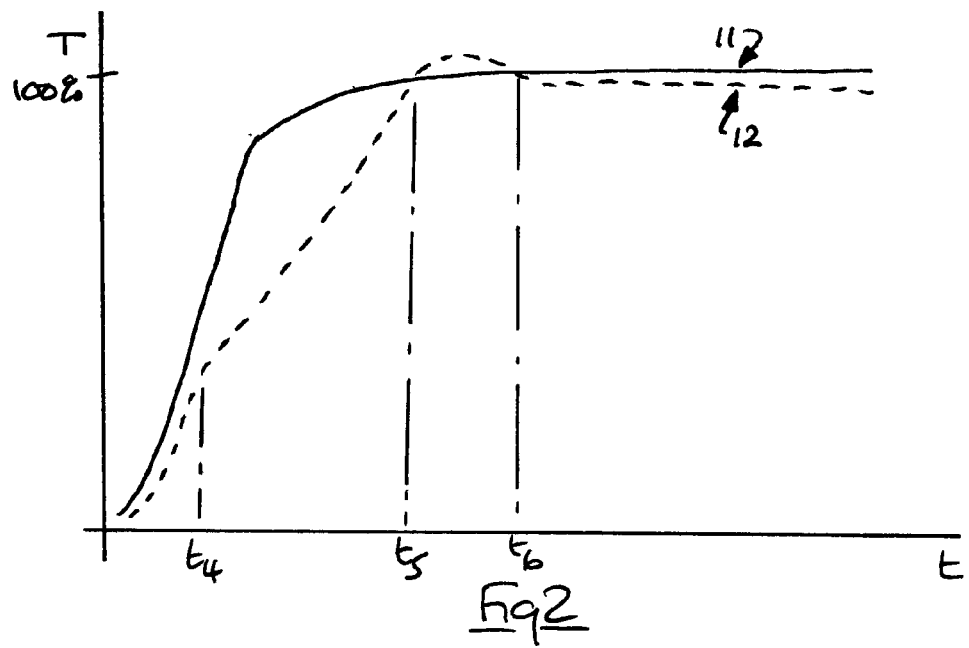
FIG. 2 is a graphical representation of demanded and actual vehicle torque of a internal combustion engine at a significant altitude.

FIG. 2 represents torque response of the same engine at a significant altitude, for example 2000 m above sea level. In this case natural aspiration of the engine allows the torque response to follow demand for a more limited period, because air pressure is reduced. Thus the turbo lag effect commences at $t_4$ and continues to $t_5$, with a slight overshoot to $t_6$.

It is apparent that available torque lags demand by a significant period. For example a demand of maximum torque by the driver may result in a delay of 1-2 seconds before the vehicle engine delivers maximum torque. This delay is noticeable, and undesirable. The turbo is a type of forced induction device. Superchargers are also forced induction devices. Supercharged engines may also be susceptible to lag at altitudes above sea level. However, lag is much less likely in supercharged engines because this type of forced induction device is directly linked to engine speed. Nevertheless, where turbo lag is mentioned in the following text, it is to be understood to include the lag from other forms of forced induction devices.

The invention provides for engine output torque to be boosted to compensate for the turbo lag effect, whilst ensuring that sufficient reserve of electrical energy is available notwithstanding that the vehicle is normally operated as a parallel hybrid with electric traction used in preference to the internal combustion engine.

Figure 3:
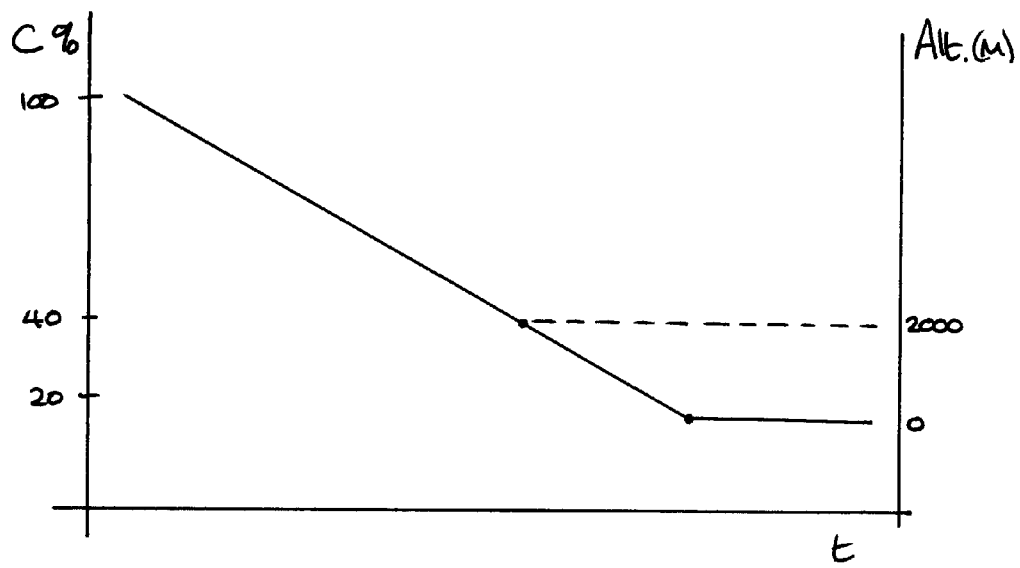
FIG. 3 is a graphical representation of the variation with altitude of residual battery capacity according to an embodiment of the invention.

With reference to FIG. 3, the state of charge (C) of a battery of a hybrid vehicle used in sequential parallel hybrid mode is represented. Charge depletes over time from maximum (100%) to a predetermined minimum (e.g. 20%) after which the vehicle relies solely upon the internal combustion engine thereof. Straight line depletion is illustrated for simplicity, though in practice a more complex discharge characteristic may apply.

Figure 4:
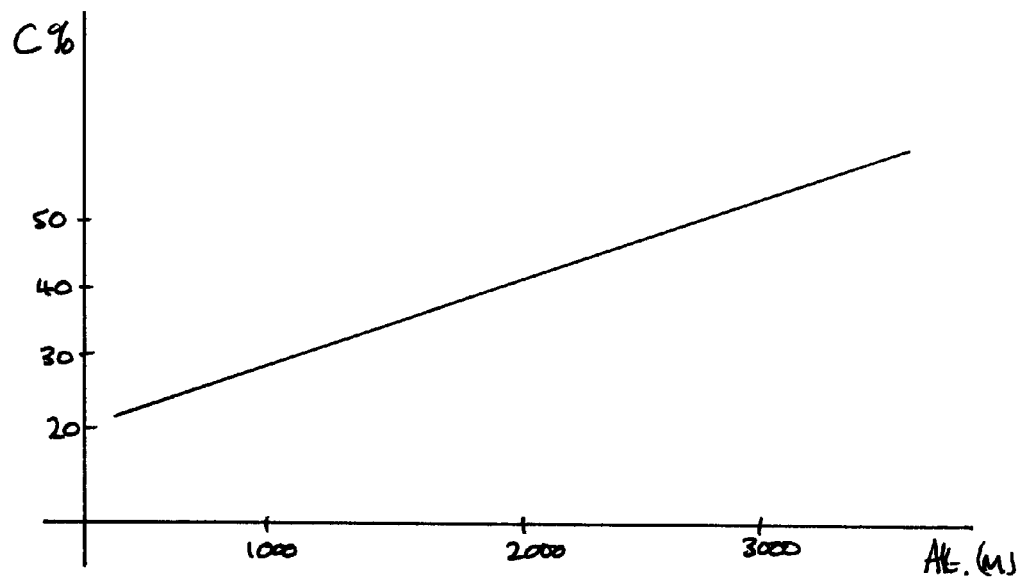
FIG. 4 is a graphical representation of an increase in state of battery charge with altitude, according to an embodiment of the invention.

According to the invention, the state of battery charge is raised above the minimum in the event that the vehicle is used at altitude, so that for example the residual charge is 40% at 2000 m above sea level. Vehicle altitude may be sensed by, for example, an atmospheric pressure sensor, and the electrical output signal from such a sensor may be used to determine a progressive increase in the target residual charge. FIG. 4 shows a straight line relationship whereby residual charge is increased linearly from 20% to 50% as altitude increases from sea level to 3000 m.

In use electric motor torque is used to supplement the torque output of the internal combustion engine in order to substantially eliminate the turbo lag effect at altitude, whilst preserving a minimum state of charge in the battery. Conventional techniques may be used for temporarily or momentarily operating the vehicle in a mode where electric traction assists the internal combustion engine.

The invention allows compensation for the turbo lag effect without special measures for increasing the mass flow of air through the engine at altitude.

Hybrid vehicles typically may allow for re-charging of the traction battery by a generator driven by the internal combustion engine, typically on overrun, or by energy recovery under braking. Accordingly the vehicle may charge or re-charge the traction battery to achieve a desired residual charge greater than the minimum charge. Such an arrangement is particularly desirable where vehicle altitude changes significantly during a driving event. Residual charge may be allowed to fall in the event of a significant reduction in altitude.

The invention may be applied to a vehicle starting from rest, for example when pulling away from a road junction, to give immediate urge on demand at all altitudes. The invention may also be applied to a moving vehicle during a change of gear ratio, in the event that engine speed and hence torque output momentarily reduces.

The example described herein concerns sequential parallel operation of a hybrid vehicle comprising an internal combustion engine and an electric motor/traction battery. It is however also applicable to other kinds of vehicle where momentary electrical power assistance is available, such as a vehicle filled with a belt integrated starter generator (BISG). A BISG vehicle allows an engine to be stopped and automatically restarted, for example during a temporary halt at traffic lights. A BISG system may be used to momentarily supplement engine torque of a running engine so as to ameliorate the turbo lag effect.

The invention claimed is:

1. A method of defining a residual capacity of a battery of a vehicle having an internal combustion engine and a forced induction device, said battery being adapted to supplement output torque of said engine via a rotary electrical machine during a lag period of the forced induction device, said method comprising:
    defining a minimum capacity of said battery;
    defining a residual capacity above said defined minimum capacity, said defined residual capacity increasing with vehicle altitude;
    driving the vehicle in a first mode of operation when a capacity of the battery is above the defined residual capacity, using only the rotary electrical machine to provide output torque; and
    driving the vehicle in a second mode of operation when the capacity of the battery is below the defined residual capacity and above the defined minimum capacity, using the rotary electrical machine only to provide supplemental torque to said engine only during the lag period.

2. The method of claim 1, wherein said defined residual capacity is substantially zero at sea level.

3. The method of claim 1, wherein said defined residual capacity increases in proportion to the increase in vehicle altitude above sea level.

4. The method of claim 3, wherein the increase in said defined residual capacity is directly proportional to the increase in vehicle altitude.

5. The method of claim 1, and including the step of charging said battery from said vehicle to maintain battery charge above said defined residual capacity.

6. The method of claim 5, wherein charging comprises generating electrical power from a generator of the vehicle engine and/or by regenerative braking of the vehicle.

7. The method of claim 1, wherein said defined residual capacity is periodically calculated according to the instant altitude of said vehicle.

8. The method of claim 1, wherein said battery is a traction battery adapted for driving said vehicle independently to the internal combustion engine.

9. The method of claim 1, wherein said battery is associated with a belt integrated starter generator of a vehicle.

10. The method of claim 1, wherein said forced induction device is a turbo.

11. The method of claim 1, wherein said forced induction device is a supercharger.

12. The method of claim 1, further comprising:
    sensing that engine output torque is lower than the torque demanded by the driver of the vehicle during the lag period of the forced induction device; and
    supplementing engine torque with torque from the electric machine to provide a combined torque substantially equal to the torque demanded by the driver during the lag period.

13. The method of claim 12, wherein said forced induction device is a turbo or a supercharger.

* * * * *